United States Patent
Yanase et al.

(10) Patent No.: US 10,610,941 B2
(45) Date of Patent: Apr. 7, 2020

(54) DRESSING DEVICE AND GEAR GRINDING DEVICE

(71) Applicant: MITSUBISHI HEAVY INDUSTRIES MACHINE TOOL CO., LTD., Ritto-shi, Shiga (JP)

(72) Inventors: Yoshikoto Yanase, Tokyo (JP); Satoru Kambayashi, Tokyo (JP); Go Hiroki, Tokyo (JP)

(73) Assignee: DAICEL CORPORATION, Osaka-Shi (JP)

(*) Notice: Subject to any disclaimer, the term of this patent is extended or adjusted under 35 U.S.C. 154(b) by 189 days.

(21) Appl. No.: 14/432,575

(22) PCT Filed: Jul. 19, 2013

(86) PCT No.: PCT/JP2013/069589
§ 371 (c)(1),
(2) Date: Mar. 31, 2015

(87) PCT Pub. No.: WO2014/061327
PCT Pub. Date: Apr. 24, 2014

(65) Prior Publication Data
US 2015/0251260 A1 Sep. 10, 2015

(30) Foreign Application Priority Data
Oct. 17, 2012 (JP) .................................. 2012-229433

(51) Int. Cl.
*B23F 23/12* (2006.01)
*B24B 53/075* (2006.01)
(Continued)

(52) U.S. Cl.
CPC ............ *B23F 23/1225* (2013.01); *B23F 5/04* (2013.01); *B23F 9/02* (2013.01); *B24B 53/075* (2013.01); *B24B 53/085* (2013.01)

(58) Field of Classification Search
CPC ...... B23F 23/1225; B23F 5/04; B23F 21/026; B24B 53/075; B24B 53/085; B24B 53/12
(Continued)

(56) References Cited

U.S. PATENT DOCUMENTS

| 5,116,173 A | 5/1992 | Goldrich |
| 5,289,815 A | 3/1994 | Krenzer |

(Continued)

FOREIGN PATENT DOCUMENTS

| CN | 1124016 A | 6/1996 |
| CN | 1143341 A | 2/1997 |

(Continued)

OTHER PUBLICATIONS

International Preliminary Report on Patentability and Translation of the Written Opinion of the International Searching Authority (Forms PCT/IB/338, PCT/IB/373 and PCT/ISA/237), dated Apr. 30, 2015, for International Application No. PCT/JP2013/069589.

(Continued)

*Primary Examiner* — Timothy V Eley
(74) *Attorney, Agent, or Firm* — Birch, Stewart, Kolasch & Birch, LLP

(57) ABSTRACT

This dressing device has: a gear grinding tool spindle (7) that rotatably supports a screw-shaped grindstone (10); and a dressing tool (30) that dresses the screw-shaped grindstone (10). The dressing device dresses the screw-shaped grindstone (10) by driving the screw-shaped grindstone (10) to rotate, and causing the relative motion of the screw-shaped grindstone (10) and/or the dressing tool (30). The dressing device performs a dressing process on the screw-shaped grindstone (10) in a manner such that the pressure angle changes along the direction of the tooth line by means of moving the screw-shaped whetstone (10) and/or dressing tool (30) at a fixed speed and altering the speed of rotation (Continued)

of the screw-shaped grindstone (10), or rotating the screw-shaped grindstone (10) at a fixed speed and altering the speed of motion in the axial direction of the screw-shaped grindstone (10) and/or the dressing tool (30).

3 Claims, 3 Drawing Sheets

(51) Int. Cl.
  *B23F 5/04* (2006.01)
  *B23F 9/02* (2006.01)
  *B24B 53/085* (2006.01)

(58) Field of Classification Search
  USPC .............................................. 451/5, 56, 253
  See application file for complete search history.

(56) References Cited

U.S. PATENT DOCUMENTS

| | | | |
|---|---|---|---|
| 5,738,569 | A | 4/1998 | Mackowsky |
| 5,954,568 | A | 9/1999 | Wirz |
| 6,077,150 | A | 1/2000 | Jankowski |
| 6,217,409 | B1 * | 4/2001 | Stadtfeld ................... B23F 5/04 451/147 |
| 2005/0266774 | A1 | 12/2005 | Baldeck |
| 2006/0014474 | A1 | 1/2006 | Yanase et al. |
| 2006/0025050 | A1 * | 2/2006 | Yanase ................ B23F 23/1225 451/5 |
| 2007/0202774 | A1 | 8/2007 | Yanase et al. |
| 2011/0275290 | A1 * | 11/2011 | Ochi .......................... B23F 5/04 451/56 |
| 2015/0118938 | A1 * | 4/2015 | Nakagawa ................ B23F 5/04 451/5 |

FOREIGN PATENT DOCUMENTS

| | | |
|---|---|---|
| CN | 1701884 A | 11/2005 |
| CN | 1721114 A | 1/2006 |
| CN | 101028658 A | 9/2007 |
| DE | 19706867 A1 | 8/1998 |
| JP | 10-230460 A | 9/1998 |
| JP | 2006-35400 A | 2/2006 |
| JP | 2006-224239 A | 8/2006 |
| JP | 2007-30079 A | 2/2007 |
| JP | 4648219 B2 | 3/2011 |

OTHER PUBLICATIONS

International Search Report and Written Opinion of the International Searching Authority (Forms PCT/ISA/210, PCT/ISA/220 and PCT/ISA/237), dated Oct. 22, 2013, International Application No. PCT/JP2013/069589, including English Translation of International Search Report.

Chinese Office Action and Search Report, dated Apr. 25, 2016, for corresponding Chinese Application No. 201380051460.0 with an English translation.

Japanese Notice of Allowance, dated Jul. 5, 2016, for Japanese Application No. 2012-229433, as well as an English translation.

* cited by examiner

DRESSING DEVICE AND GEAR GRINDING DEVICE

TECHNICAL FIELD

The present invention relates to a dressing device for a threaded grinding wheel and a gear grinding device using the threaded grinding wheel.

BACKGROUND ART

Gears can be categorized into various types according to usage application, and detailed profiles are set for teeth of gears to suit usage application and usage environment. For example, an involute tooth profile tracing an involute curve of a pressure angle θ (generally, θ=20°) in a tooth profile direction has advantages in terms of usability such as an advantage that gears adjacent to each other rotate smoothly even when the distance between the centers of the gears changes to a certain degree. Moreover, breakage and the like of a tooth due to partial contact of a tooth face can be prevented by providing crowning on the tooth face in which a center portion of the tooth in a tooth trace direction bulges and both end portions of the tooth have small thickness.

Detailed profiles like ones described above can be easily set for a gear by using a gear grinding device. However, in a case of combining detailed profiles like ones described above and setting the combined profile for one gear, for example, in a case where crowning is set for the involute tooth profile described above, it is difficult to uniformly machine the gear with both of the involute curve and the crowning. Providing the crowning causes the involute curve and the pressure angle θ to vary in the tooth trace direction and the tooth face is twisted.

Such twisting of the tooth face is called bias and the degree of twisting is called bias amount. Techniques of bias correction and bias adjustment for setting the bias amount to zero to eliminate the twisting of the tooth face are being popularly studied.

PRIOR ART DOCUMENT

Patent Document

Patent Document 1: Japanese Patent No. 4648219

SUMMARY OF THE INVENTION

Problems to be Solved by the Invention

Patent Document 1 is an example of the aforementioned technique for correcting a bias in a gear. The technique of Patent Document 1 is a technique in which the pressure angle θ of a helical tooth formed on a peripheral surface of a threaded grinding wheel is made to vary in a tooth trace direction by performing dressing with a dressing tool with the threaded grinding wheel being inclined. This technique can provide such bias correction that the pressure angle θ of a tooth face of a helical gear gradually varies from one end side to the other end side in the tooth trace direction according to the variation of the pressure angle θ of the threaded grinding wheel.

However, in order to make the pressure angle θ of a tooth to vary by turning the threaded grinding wheel, it is necessary that a mechanism for turning the threaded grinding gear has high stiffness and a position detecting sensor and the like are provided to perform a highly-accurate turning operation.

The technique of Patent Document 1 thus involves an increase in the size of the gear grinding device and an increase in the manufacturing cost.

The present invention has been made in view of the problems described above, and an object thereof is to enable adjustment of a bias amount in a gear without involving an increase in the size of the device and an increase in the manufacturing cost.

Means for Solving the Problems

A dressing device in a first aspect of the invention for solving the problems described above is characterized in that the dressing device comprises: a gear grinding tool spindle by which a threaded grinding wheel used for machining of a gear is rotatably supported; and a dressing tool which is rotatably supported parallel to the gear grinding tool spindle and which dresses the threaded grinding wheel, the dressing device being configured to dress the threaded grinding wheel by: rotationally driving the threaded grinding wheel; bringing the threaded grinding wheel and the dressing tool into contact with each other; and moving at least one of the threaded grinding wheel and the dressing tool relative to each other in an axial direction of the threaded grinding wheel and the dressing tool, wherein a dressing process is performed on the threaded grinding wheel such that a pressure angle varies in a tooth trace direction, the dressing process performed by: changing a rotating speed of the threaded grinding wheel while moving at least one of the threaded grinding wheel and the dressing tool in the axial direction at a constant speed; or changing a moving speed of at least one of the threaded grinding wheel and the dressing tool in the axial direction while rotating the threaded grinding wheel at a constant speed.

A dressing device in a second aspect of the invention for solving the problems described above is characterized in that the gear grinding device comprises: a work gear spindle by which a work gear is rotatably supported; and a gear grinding tool spindle by which a threaded grinding wheel configured to grind the work gear is rotatably supported and which is parallel to a direction orthogonal to the work gear spindle, the gear grinding device being capable of performing bias adjustment of the work gear by using the threaded grinding wheel, wherein a tool in which a pressure angle varies in a tooth trace direction is used as the threaded grinding wheel, the work gear and the threaded grinding wheel are rotationally driven and at least one of the work gear and the threaded grinding wheel is moved in an axial direction of the threaded grinding wheel so that a tooth face of the threaded grinding wheel in which the pressure angle varies comes into contact with a tooth face of the work gear, and the number of revolutions of the work gear is controlled to correspond to variation of a lead of the threaded grinding wheel.

Effect of the Invention

In the dressing device of the first aspect of the invention, the dressing process can be performed on the threaded grinding wheel such that a pressure angle varies in a tooth trace direction, without inclining the gear grinding tool spindle and the dressing tool, the dressing process performed by: changing a rotating speed of the threaded grinding wheel while moving at least one of the threaded grinding wheel and the dressing tool in the axial direction of the threaded grinding wheel and the dressing tool at a constant speed; or changing a moving speed of at least one of the threaded grinding wheel and the dressing tool in the axial direction of the threaded grinding wheel and the dressing tool while rotating the threaded grinding wheel at a constant speed. Accordingly, there is no need to provide a mechanism for inclining the gear grinding tool spindle and the dressing tool, a sensor for measuring the inclination, and the like. Hence, an increase in the manufacturing cost of the dressing device can be suppressed.

In the gear grinding device of the second aspect of the invention, the work gear and the threaded grinding wheel are rotationally driven and at least one of the work gear and the threaded grinding wheel is moved in the axial direction of the threaded grinding wheel so that the tooth face of the threaded grinding wheel in which the pressure angle varies comes into contact with the tooth face of the work gear, and the number of revolutions of the work gear is controlled to correspond to the variation of the lead of the threaded grinding wheel. This makes it possible to form a work gear with a constant lead into a predetermined shape and facilitate adjustment of a bias.

MODE FOR CARRYING OUT THE INVENTION

An embodiment of a gear grinding device of the present invention is described below in detail with reference to the attached drawings. As a matter of course, the present invention is not limited to the following embodiment and various modifications can be made within a scope not departing from the spirit of the present invention.

Embodiment 1

Figure 1:
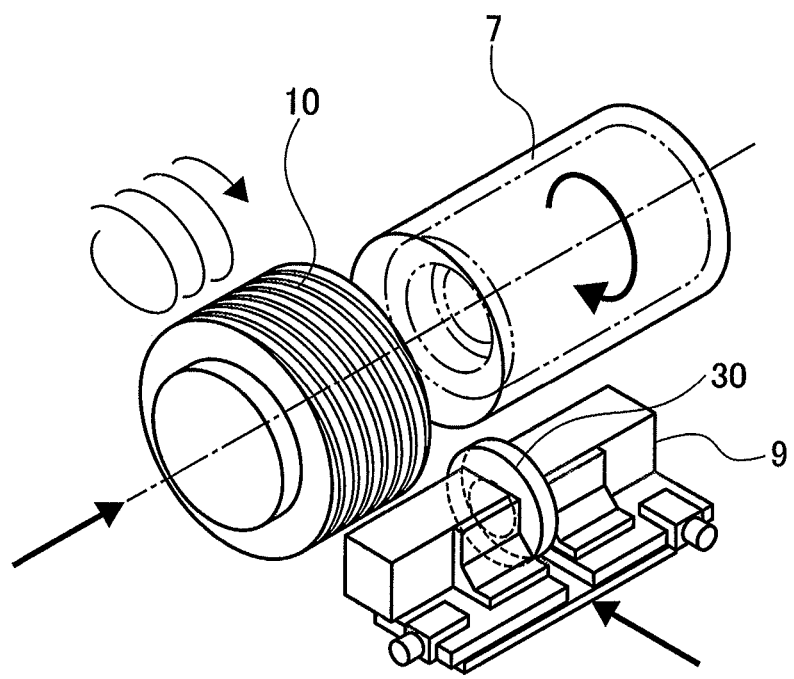
FIG. 1 is a schematic diagram showing dressing in a gear grinding device of Embodiment 1.
Figure 1:
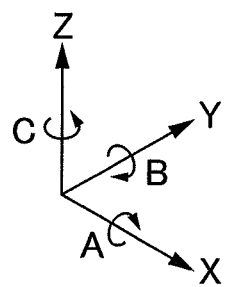
Figure 2:
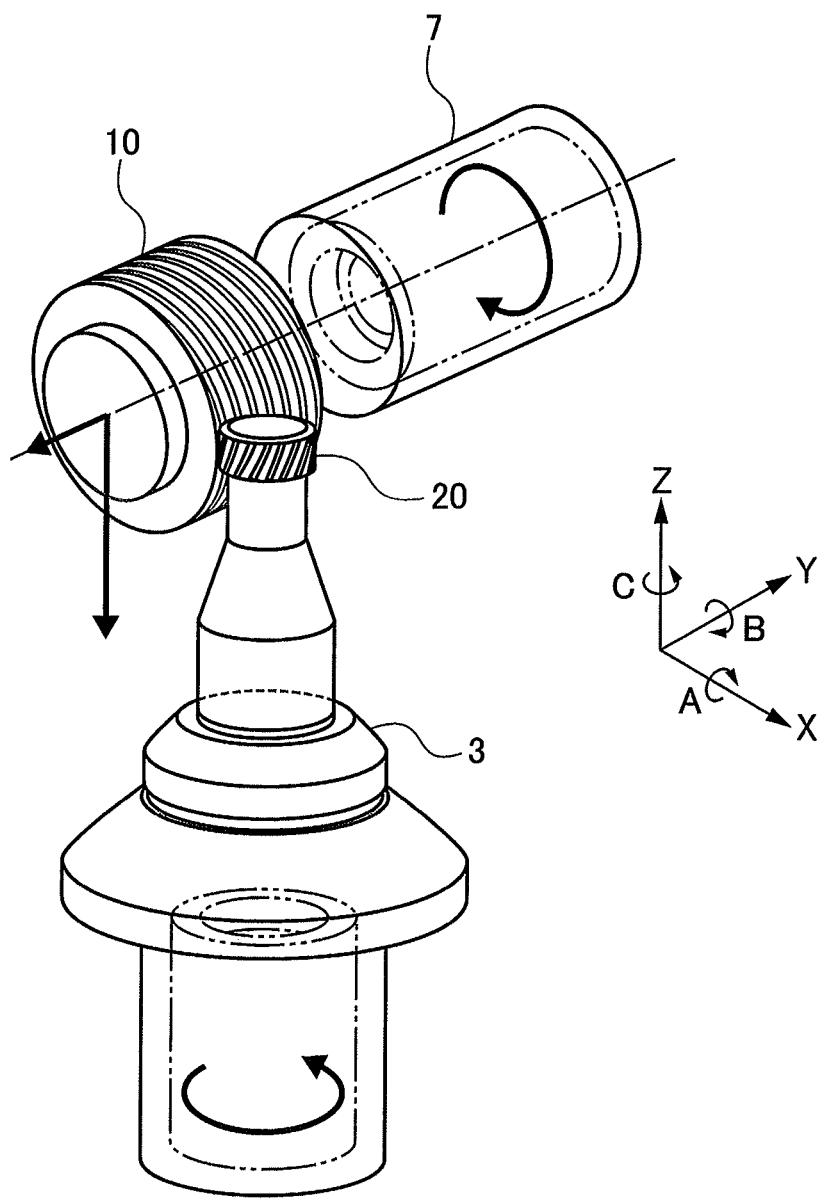
FIG. 2 is a schematic diagram showing gear grinding in the gear grinding device of Embodiment 1.

A structure of the gear grinding device in Embodiment 1 of the present invention is described with reference to FIGS. 1 to 3.

Figure 3:
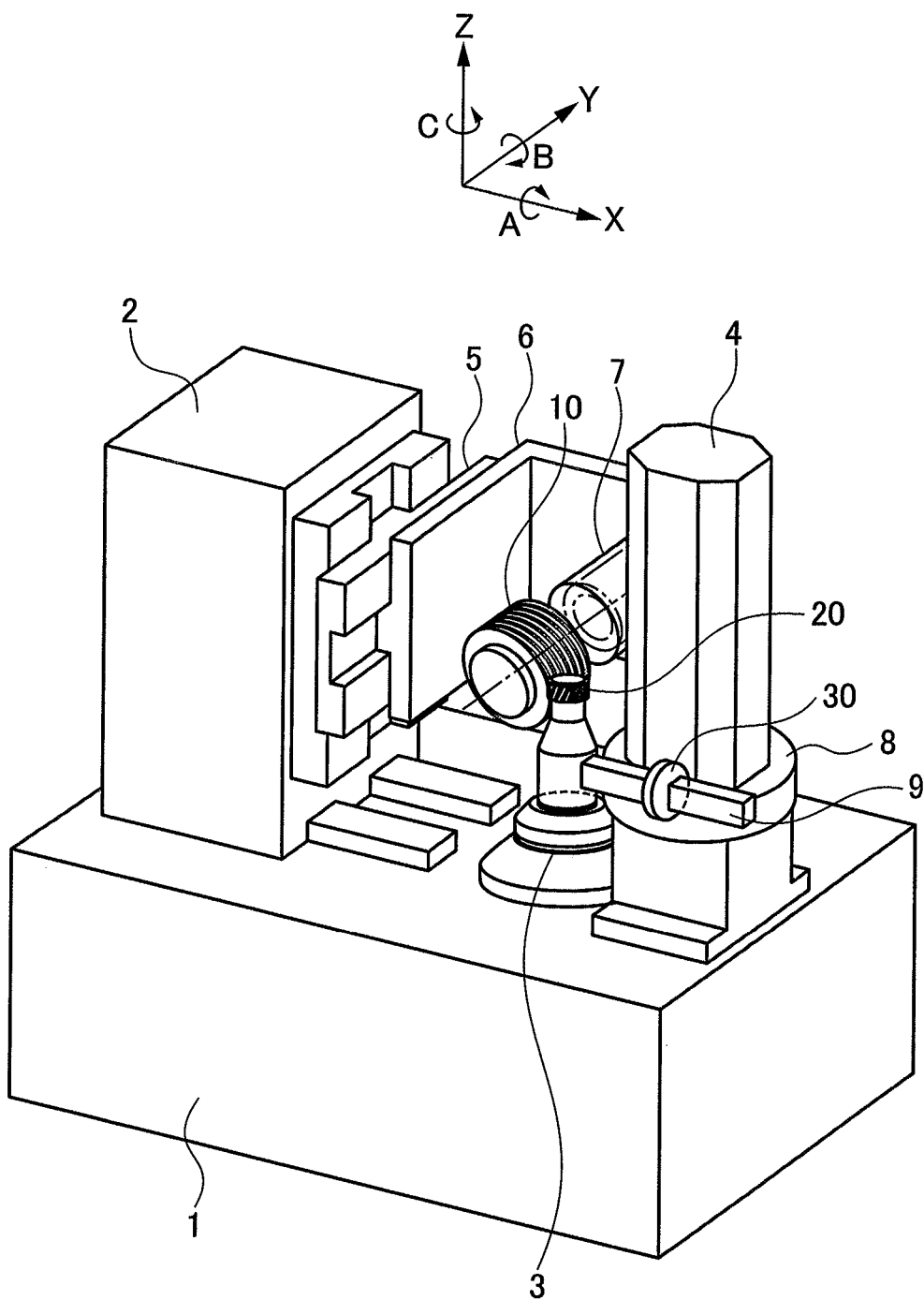
FIG. 3 is a schematic diagram showing the gear grinding device of Embodiment 1.

The gear grinding device in the embodiment is a device incorporating a function of grinding a gear and a function of dressing a threaded grinding wheel and, as shown in FIG. 3, includes a bed 1, a column 2, a table 3, and a counter column 4. The column 2 is installed on the bed 1 to be movable in one direction (X direction). The table 3 is rotatably installed in front of the column 2 in the moving direction thereof, and the counter column 4 is installed further in front of the table 3. In the embodiment, the moving direction of the column 2 is referred to as X-axis, a vertical direction orthogonal to the X-axis is referred to as Z-axis, a direction orthogonal to the X-axis and the Z-axis is referred to as Y-axis, rotation about the X-axis is referred to as A-axis rotation, rotation about the Y-axis is referred to as B-axis rotation, and rotation about the Z-axis is referred to as C-axis rotation.

The column 2 movable in the X-axis direction on the bed 1 is provided with a gear grinding tool spindle 7 with a Z-axis moving mechanism 5 movable in the Z-axis direction and a Y-axis moving mechanism 6 movable in the Y-axis direction provided therebetween, and a threaded grinding wheel 10 which is a grinding tool for a gear is rotatably supported by the gear grinding tool spindle 7.

The threaded grinding wheel 10 used for grinding of a gear in the gear grinding device of the embodiment is dressed into a shape different from a conventional shape by a dressing operation of the threaded grinding wheel 10 to be described later. One helical tooth is provided in the threaded grinding wheel 10 and has such a profile that the lead of the tooth gradually decreases from one end side toward the other end side of the threaded grinding wheel 10 in an axial direction thereof and the pressure angle $\theta$ of the tooth gradually increases from one end side toward the other end side of the threaded grinding wheel 10 in a tooth trace direction thereof. Making the pressure angle $\theta$ vary in the tooth trace direction as described above enables adjustment of a bias amount in grinding of a work gear 20 by the threaded grinding wheel 10.

The counter column 4 is provided with a turning ring 8 turnable around an outer periphery of the counter column 4. The work gear 20 is gripped by a not-illustrated gripper provided on the turning ring 8. Loading and unloading of the work gear 20 to and from the table 4 is performed by turning the turning ring 8. When the work gear is loaded onto the table 4 and is fixed thereto, the threaded grinding wheel 10 can perform the grinding of the work gear 20 (see FIG. 2).

In the grinding of the work gear 20 by the threaded grinding wheel 10, the column 2 is moved in the X-axis direction to bring the threaded grinding wheel 10 performing the B-axis rotation close to the work gear 20 performing the C-axis rotation, and the threaded grinding wheel 10 is moved in the Z-axis direction by the Z-axis moving mechanism 5 of the column 2 and is also moved in the Y-axis direction by the Y-axis moving mechanism 6 of the column 2.

A dressing unit 9 configured to dress the threaded grinding wheel 10 is provided on the turning ring 8 at a position different from that of the not-illustrated gripper, and a dressing tool 30 is attached to the dressing unit 9. The turning of the turning ring 8 causes the dressing unit 9 to move close to and away from the threaded grinding wheel 10. Dressing of the threaded grinding wheel 10 by the dressing tool 30 can be performed by disposing the dressing unit 9 close to the threaded grinding wheel 10 (see FIG. 1).

In the dressing of the threaded grinding wheel 10 by the dressing tool 30, a not-illustrated pressing mechanism presses the dressing tool 30 against the threaded grinding wheel 10 performing the B-axis rotation, and the threaded grinding wheel 10 is moved in the Y-axis direction by the Y-axis moving mechanism 6 of the column 2.

Next, the dressing operation in the gear grinding device of the embodiment is described with reference to FIGS. 1 and 3.

The work gear 20 is set to a state removable from the table 3 and is gripped by the not-illustrated gripper provided on the counter column 4. The counter column 4 is rotated with the not-illustrated gripper gripping the work gear 20 to remove the work gear 20 from the table 3 and to also bring the dressing unit 9 close to the threaded grinding wheel 10. Dressing is performed by rotationally driving the gear grinding tool spindle 7 and the threaded grinding wheel 10 and by causing the not-illustrated pressing mechanism to press the dressing tool 30 against the rotating threaded grinding wheel 10.

As described above, in order to form the threaded grinding wheel 10 having the one tooth whose pressure angle $\theta$ varies in the tooth trace direction, the Y-axis moving mechanism 6 of the column 2 moves the threaded grinding wheel 10 in the Y-axis direction at a constant speed and the gear grinding tool spindle 7 changes the rotating speed of the threaded grinding wheel 10. Changing the rotating speed of the threaded grinding wheel 10 while maintaining a constant Y-axis feeding speed of the threaded grinding wheel 10 can make the lead of the threaded grinding wheel 10 vary in the axial direction and enables formation of the one tooth whose pressure angle θ varies in the tooth trace direction.

In the embodiment, while a position where the dressing tool 30 is pressed against the threaded grinding wheel 10 moves from the one end side to the other end side of the threaded grinding wheel 10, the rotating speed of the threaded grinding wheel 10 is changed from a low rotating speed to a high rotating speed with the Y-axis feeding speed of the threaded grinding wheel 10 being constant. When compared, the lead on the one end side is large and the lead on the other end side is small in the threaded grinding wheel 10. Moreover, the pressure angle θ of the tooth in the threaded grinding wheel 10 varies with the variation of the lead of the tooth in the threaded grinding wheel 10. When compared, the pressure angle θ of the tooth on the one end side is small and the pressure angle θ of the tooth on the other end side is large in the threaded grinding wheel 10.

As a matter of course, the profile of the tooth in the threaded grinding wheel 10 is not limited to that in the embodiment. For example, in the dressing of the threaded grinding wheel 10, the rotating speed of the threaded grinding wheel 10 is changed from a high rotating speed to a low rotating speed from the one end side toward a center portion of the threaded grinding wheel 10 and is changed from a low rotating speed to a high rotating speed from the center portion toward the other end side of the threaded grinding wheel 10. The threaded grinding wheel 10 in which the pressure angle θ near both ends is large and the pressure angle θ near the center is small can be thereby formed.

Alternatively, in order to form the threaded grinding wheel 10 having the one tooth whose pressure angle θ varies in the tooth trace direction, the gear grinding tool spindle 7 rotates the threaded grinding wheel 10 at a constant speed and the Y-axis moving mechanism 6 of the column 2 changes the moving speed of the threaded grinding wheel 10 in the Y-axis direction. Changing the Y-axis feeding speed of the threaded grinding wheel 10 while maintaining the constant rotating speed of the threaded grinding wheel 10 can make the lead of the threaded grinding wheel 10 vary in the axial direction and enables formation of the one tooth whose pressure angle θ varies in the tooth trace direction.

As described above, a tooth whose pressure angle θ varies in the tooth trace direction can be formed in the threaded grinding wheel 10 without inclining the gear grinding tool spindle 7 and the dressing tool 30. Accordingly, there is no need to provide a mechanism for inclining the gear grinding tool spindle 7 and the dressing tool 30, a sensor for measuring the inclination, and the like. Hence, an increase in the manufacturing cost of the gear grinding device can be suppressed.

Next, the gear grinding operation in the gear grinding device of the embodiment is described with reference to FIGS. 1 and 2.

In the embodiment, the work gear 20 is grinded such that teeth of the work gear 20 are crowned and the pressure angle θ in each tooth is constant in the tooth trace direction. In other words, the work gear 20 in which the bias amount is zero is produced.

After the aforementioned dressing process of the threaded grinding wheel 10 in the gear grinding device, the not-illustrated gripper provided on the counter column 4 grips the raw work gear 20 to load the raw work gear 20 onto the table 3. The counter column 4 is rotated with the gripper gripping the work gear 20 to remove the dressing tool 30 from the threaded grinding wheel 10 and to also load the work gear 20 onto the table 3. The work gear 20 is fixed to the table 3.

In a case of continuously performing the gear grinding operation of the work gears 20 without performing the dressing process of the threaded grinding wheel 10, the counter column 4 is rotated to replace the machined work gear 20 with the raw work gear 20. Note that a not-illustrated supplying device passes the raw work gear 20 to the not-illustrated gripper and a not-illustrated delivering device receives the machined work gear 20 from the not-illustrated gripper.

The gear grinding tool spindle 7 and the threaded grinding wheel 10 are rotationally driven to grind the work gear 20. The grinding of the work gear 20 is performed while being controlled by a not-illustrated control device as described below.

Since the pressure angle θ and the lead are constant in a conventional threaded grinding wheel, the grinding of the work gear is performed with the rotating speed of the work gear and the rotating speed and Z-axis feeding speed of the threaded grinding wheel being constant. Meanwhile, in the embodiment, since the pressure angle θ and the lead in the threaded grinding wheel 10 are not constant but are made to vary, the work gear 20 is grinded into a predetermined shape by changing the rotating speed of the work gear 20 and the rotating speed and Z-axis feeding speed of the threaded grinding wheel 10.

Note that, regarding the rotating speed of the work gear 20 and the rotating speed and Z-axis feeding speed of the threaded grinding wheel 10, the not-illustrated control device calculates the values of the respective speeds and performs drive control of the rotation of the work gear 20 and the rotation and Z-axis feeding of the threaded grinding wheel 10 on the basis of the calculated values.

The one end side of the tooth of the threaded grinding wheel 10 which has a small pressure angle θ is brought into contact with a portion which would be otherwise machined to have the pressure angle θ greater than a set value (hereafter, referred to as dropping tooth tip), and the other end side of the tooth of the threaded grinding wheel 10 which has a large pressure angle θ is brought into contact with a portion which would be otherwise machined to have the pressure angle θ smaller than a set value (hereafter, referred to as rising tooth tip).

In the embodiment, the dropping tooth tip of the work gear 20 occurs on the one end side in the tooth trace direction and the rising tooth tip occurs on the other end side in the tooth trace direction. Accordingly, the one end side of the tooth of the threaded grinding wheel 10 is brought into contact with the one end side of each tooth of the work gear 20, and the other end side of the tooth of the threaded grinding wheel 10 is brought into contact with the other end side of each tooth of the work gear 20. Specifically, the one tooth of the threaded grinding wheel 10 is brought into contact, from the one end side to the other end side, with each tooth of the work gear 20. The threaded grinding wheel 10 is thus moved greatly in the Z-axis direction relative to the work gear 20.

At this time, since the lead of the tooth in the threaded grinding wheel 10 varies from the one end side to the other end side, the rotating speed of the work gear 20 is changed to correspond to the variation of the lead of the tooth in the threaded grinding wheel 10. When the threaded grinding wheel 10 is moved from the one end side where the lead of the tooth is large to the other end side where the lead of the tooth is small, the rotating speed of the work gear 20 is increased. By changing the rotating speed of the work gear 20 in a way corresponding to the variation of the lead of the tooth in the threaded grinding wheel 10 as described above, the work gear 20 with a constant lead can be produced into a predetermined shape (shape in which the bias amount is zero in the embodiment).

As a matter of course, the shape of the work gear 20 is not limited to that in the embodiment. For example, the work gear 20 may be formed such that adjustment is made to provide a predetermined bias. Moreover, it is possible to differently crown a left tooth face and a right tooth face and perform bias adjustment suiting each of the faces.

EXPLANATION OF THE REFERENCE NUMERALS

1 Bed
2 Column
3 Table
4 Counter column
5 Z-axis moving mechanism
6 Y-axis moving mechanism
7 Gear grinding tool spindle
8 Turning ring
9 Dressing unit
10 Threaded grinding wheel
20 Work gear
30 Dressing tool

The invention claimed is:

1. A dressing method comprising:
   rotatably supporting a gear grinding tool spindle for driving a threaded grinding wheel used for machining of a gear;
   rotatably supporting a dressing tool parallel to the gear grinding tool spindle for dressing the threaded grinding wheel; and
   dressing the threaded grinding wheel by rotationally driving the threaded grinding wheel; bringing the threaded grinding wheel and the dressing tool into contact with each other; and moving at least one of the threaded grinding wheel and the dressing tool relative to the other in an axial direction of the threaded grinding wheel and the dressing tool, wherein
   a dressing process is performed by moving at least one of the threaded grinding wheel and the dressing tool in the axial direction at a constant speed while changing a rotating speed of the threaded grinding wheel according to a relative movement of the dressing tool from one end side to another end side of the threaded grinding wheel; or changing a moving speed of at least one of the threaded grinding wheel and the dressing tool in the axial direction according to a relative movement of the dressing tool from one end side to the other end side of the threaded grinding wheel while rotating the threaded grinding wheel at a constant speed;
   whereby the dressing process performed on the threaded grinding wheel includes varying a pressure angle from the one end side to the other end side in a tooth trace direction and varying a lead from the one end side to the other end side in the axial direction.

2. A gear grinding device comprising:
   a work gear spindle by which a work gear is rotatably supported; and
   a gear grinding tool spindle by which a threaded grinding wheel configured to grind the work gear is rotatably supported and which is parallel to a direction orthogonal to the work gear spindle,
   the gear grinding device being configured to perform bias adjustment of the work gear by using the threaded grinding wheel, wherein
   a tool in which a pressure angle varies from one end side to the other end side in a tooth trace direction and a lead varies from the one end side to the other end side in an axial direction is used as the threaded grinding wheel,
   the work gear and the threaded grinding wheel are rotationally driven and at least one of the work gear and the threaded grinding wheel is moved from the one end side to another end side in the axial direction of the threaded grinding wheel so that a tooth face of the threaded grinding wheel in which the pressure angle varies comes into contact with a tooth face of the work gear, and
   a number of revolutions of the work gear is varied to correspond to variation of a lead of the threaded grinding wheel according to a relative movement of the work gear from the one end side to the other end side of the threaded grinding wheel.

3. A dressing device comprising:
   a rotatably supported gear grinding tool spindle for driving a threaded grinding wheel for machining of a gear; and
   a rotatably supported dressing tool which is parallel to the gear grinding tool spindle and which dresses the threaded grinding wheel,
   the dressing device being configured to rotationally drive the threaded grinding wheel; to bring the threaded grinding wheel and the dressing tool into contact with each other; and to move at least one of the threaded grinding wheel and the dressing tool relative to the other in an axial direction of the threaded grinding wheel and the dressing tool, wherein
   the dressing device is configured to move at least one of the threaded grinding wheel and the dressing tool in the axial direction at a constant speed while changing a rotating speed of the threaded grinding wheel according to a relative movement of the dressing tool from one end side to another end side of the threaded grinding wheel; or to change a moving speed of at least one of the threaded grinding wheel and the dressing tool in the axial direction according to a relative movement of the dressing tool from one end side to the other end side of the threaded grinding wheel while rotating the threaded grinding wheel at a constant speed, whereby a dressing process performed on the threaded grinding wheel varies a pressure angle from the one end side to the other end side in a tooth trace direction and varies the lead from the one end side to the other end side in the axial direction.

* * * * *

UNITED STATES PATENT AND TRADEMARK OFFICE
CERTIFICATE OF CORRECTION

PATENT NO. : 10,610,941 B2
APPLICATION NO. : 14/432575
DATED : April 7, 2020
INVENTOR(S) : Yoshikoto Yanase et al.

Page 1 of 1

It is certified that error appears in the above-identified patent and that said Letters Patent is hereby corrected as shown below:

On the Title Page

Item (73):
Delete: "DAICEL CORPORATION, OSAKA-SHI (JP)"
Insert: --MISTSUBISHI HEAVY INDUSTRIES MACHINE TOOL CO., LTD., RITTO-SHI, SHIGA (JP)--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*